United States Patent [19]
Denk

[11] Patent Number: 4,908,347
[45] Date of Patent: Mar. 13, 1990

[54] DYNAMOELECTRIC MACHINE WITH DIAMAGNETIC FLUX SHIELD

[75] Inventor: Joseph Denk, Manhattan Beach, Calif.

[73] Assignee: Allied-Signal Inc., Morris Township, N.J.

[21] Appl. No.: 217,729

[22] Filed: Jul. 7, 1988

Related U.S. Application Data

[60] Continuation-in-part of Ser. No. 107,150, Oct. 9, 1987, which is a division of Ser. No. 800,184, Nov. 20, 1985, Pat. No. 4,709,180.

[51] Int. Cl.$^4$ ............................................. H02K 9/00
[52] U.S. Cl. ...................... 505/1; 310/40 R; 310/52; 310/254; 505/876; 505/877; 505/878; 505/701
[58] Field of Search ............ 310/40 R, 52, 58, 59, 310/71, 89, 184, 208, 254; 505/876, 877, 878, 701

[56] References Cited

U.S. PATENT DOCUMENTS

| | | | |
|---|---|---|---|
| 3,564,307 | 2/1971 | Kawabe | 310/10 |
| 3,742,265 | 6/1973 | Smith, Jr. | 310/52 |
| 3,816,780 | 6/1974 | Smith, Jr. et al. | 310/52 |
| 4,031,422 | 6/1977 | Armor et al. | 310/256 |
| 4,076,988 | 2/1978 | Litz | 310/52 |
| 4,087,711 | 5/1978 | Kirtley, Jr. et al. | 310/184 |
| 4,396,847 | 8/1983 | Weghaupt et al. | 310/52 |
| 4,398,108 | 8/1983 | Danilevich et al. | 310/58 |
| 4,426,592 | 1/1984 | Berzin et al. | 310/52 |
| 4,489,267 | 12/1984 | Saar et al. | 318/811 |
| 4,583,014 | 4/1986 | Murphy, Sr. et al. | 310/52 |
| 4,638,194 | 1/1987 | Keefe | 310/40 R |
| 4,709,180 | 11/1987 | Denk | 310/179 |

OTHER PUBLICATIONS

Fisher, Arthur, "Superconductivity", Popular Science, Apr. 1988, pp. 54–58.

Primary Examiner—Patrick R. Salce
Assistant Examiner—Kristine Peckman
Attorney, Agent, or Firm—David B. Abel; James W. McFarland

[57] ABSTRACT

An AC electrical machine which includes a superconducting, diamagentic flux shield cylinder enclosing the stator windings such that the magnetic flux produced by the machine's rotor is bottled within the flux shield.

14 Claims, 3 Drawing Sheets

DYNAMOELECTRIC MACHINE WITH DIAMAGNETIC FLUX SHIELD

This is a continuation-in-part of Ser. No. 107,150, Oct. 9, 1987, which is a divisional application of Ser. No. 800,184, Nov. 20, 1985, now U.S. Pat. No. 4,709,180, issued Nov. 24, 1987.

BACKGROUND OF THE INVENTION

The present invention relates generally to the construction and configuration of electrical machines including motors and generators. More specifically, the invention relates to an AC electrical machine featuring increased efficiency and reduced size as a result of the elimination of iron core losses and winding losses by the strategic use of superconducting diamagnetic materials.

Traditionally, AC machines have used either permanent magnet rotors or DC excited wound rotors to produce a rotating magnetic field linking stator windings mounted about the rotor. The stator windings were themselves surrounded by a stator core. The stator core usually included teeth extending radially inward defining slots into which the stator windings would be placed. The air gap for these types of machines is defined as the distance between the surface of the rotor magnetic pole and the innermost portion of the stator core. The stator core provided a magnetic link between opposite magnetic poles on the rotor, with the only open sections of the magnetic link being those defined by the air gap. While the stator core and stator teeth were believed necessary to provide the magnetic link within electrical machines, the core is also a source of energy loss within the machine primarily in the form of hysteresis and eddy current losses.

With the introduction of high magnetic strength permanent magnets, it became possible to build electrical machines which have much larger magnetic air gaps and which have eliminated the stator teeth altogether, as for example J. Denk, U.S. Pat. No. 4,709,180 herein incorporated by reference. Additionally, losses associated with eddy currents within the stator core were reduced by the use of laminated disks of ferromagnetic material to construct the stator core. However, even with this construction, the losses associated with the stator core account for about 25% of the machines total losses, the remainder being copper winding losses, miscellaneous eddy current losses, bearing heat, and windage losses.

It is therefore apparent that in order to significantly improve he efficiency of electrical machines of this type, the losses associated with the stator core, the bearings, or the windings must be reduced.

DISCLOSURE OF THE INVENTION

It is an object of the present invention to define a dynamoelectrical machine wherein the internal losses within the machine are minimized or eliminated and the efficiency of the machine is maximized. The invention completely eliminates the ferromagnetic stator core, replacing the core with a diamagnetic superconducting flux shield. The diamagnetic property of the flux shield prevents magnetic flux penetration, effectively bottling the magnetic field produced by a permanent magnet rotor. The magnetic field is thus confined within a cylinder defined by the outer diameter of the rotor and the inner diameter of the flux shield. The machine's stator windings are also disposed within this cylinder, mounted within slots defined by non-metallic fins which project radially outward from a non-metallic cylinder having an internal diameter slightly larger than the outer diameter of the rotor. It may therefore be appreciated that the magnetic field is constrained to rotate synchronously with the rotor within a cylindrical area substantially filled with stator windings. Thereby, the entire magnetic field is available to induce electrical potential within the stator windings.

A further object of the invention is an electrical machine wherein the machine rotor tends to center itself within the diamagnetic flux shield cylinder by virtue of the interaction of the rotor magnets, the diamagnetic flux shield and the magnetic field surrounding the rotor and compressed within the flux shield. In effect, the rotor acts as a magnetic bearing, centralizing and stabilizing itself within the electrical machine. This significantly reduces frictional losses associated with the shaft bearings, and the machine may not require journal bearings for the rotor assembly.

A further object of the invention contemplates the use of superconducting wires for the stator windings. Superconducting wires eliminate resistance losses within the stator windings, thereby potentially increasing the machine efficiency. Additionally, the development of new superconducting material which remain superconductive at higher temperatures and which can transmit higher current densities will allow the number of stator windings to be reduced and the area dedicated to stator windings within the electrical machine to be compressed.

DESCRIPTION OF THE DRAWINGS

These and other objects and advantages of the invention will become apparent from the following detailed description taken in conjunction with the appended figures, wherein.

BEST MODE OF CARRYING OUT THE INVENTION

Figure 1:
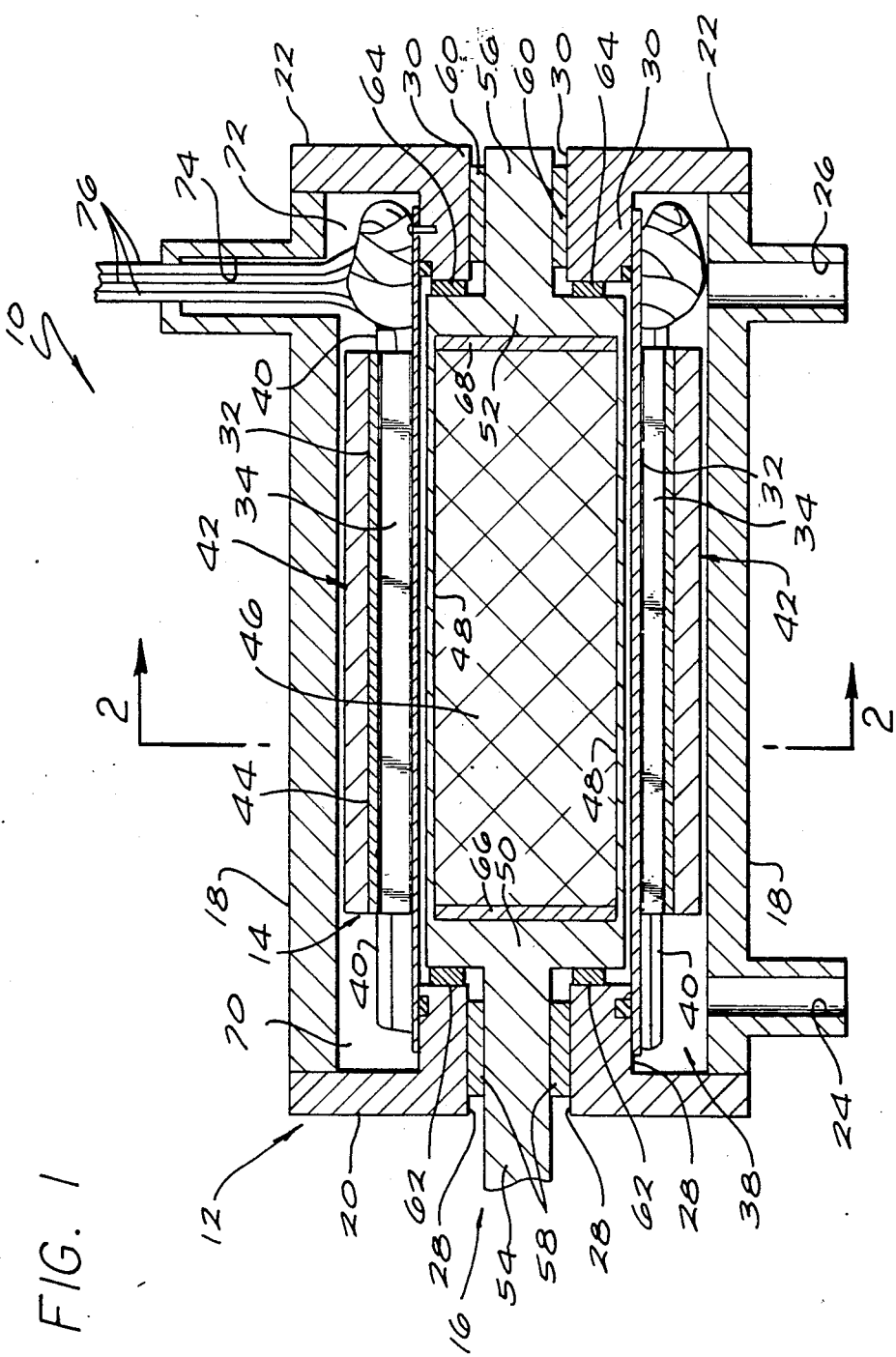
FIG. 1 is a cross-sectional view of a dynamoelectric machine constructed according to the teachings of the present invention.
Figure 2:
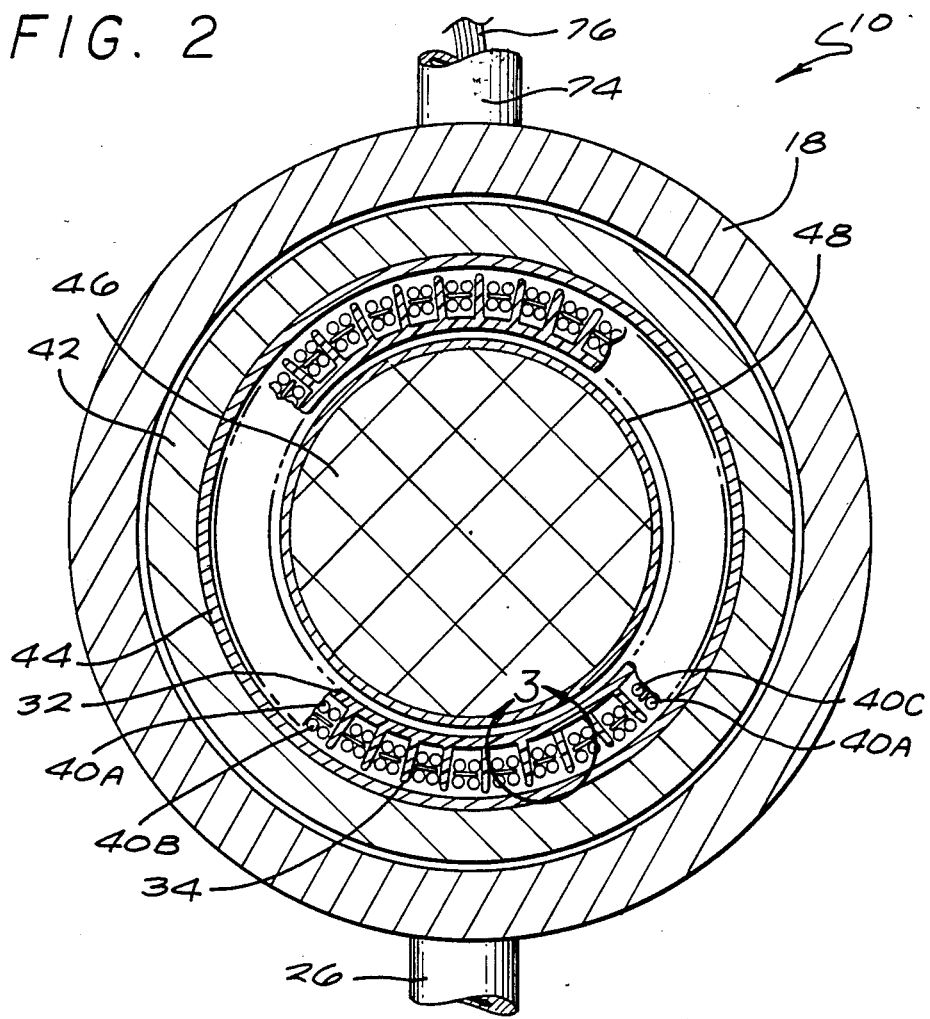
FIG. 2 is a cross-sectional view along the line 2—2 of FIG. 1.
Figure 3:
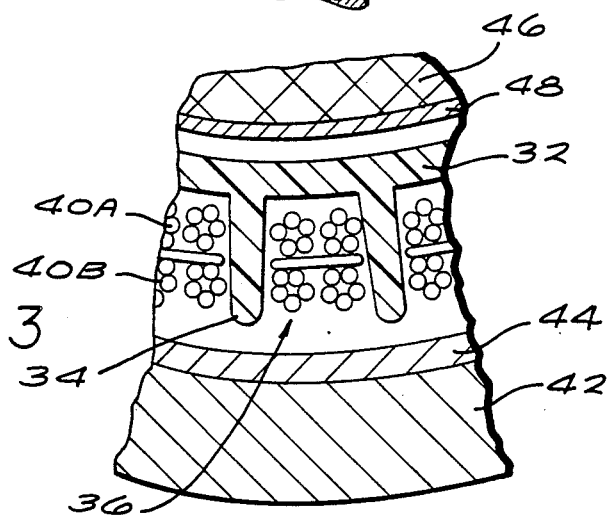
FIG. 3 is an enlarged view of a portion of the stator of FIG. 2 identified by circular line 3.

The invention will be described with reference to FIGS. 1 and 2 wherein FIG. 1 depicts a cutaway view of a dynamoelectric machine 10 of the present invention and FIG. 2 shows a cross-sectional view of the machine 10 along the line 2—2 of FIG. 1. The machine 10 includes a housing assembly 12 which contains therein a stator assembly 14 and a rotor assembly 16. The housing assembly 12 is made up of three parts, a generally cylindrical central housing section 18, and first and second end bells 20, 22 respectively, which are attached to opposite ends of central housing section 18. The central housing section 18 additionally has a coolant inlet port 24 located near one end and a coolant outlet port 26 located near an opposite end. The end bells 20, each have cylindrical bearing support areas 28, 30 which project axially a short distance toward the center of the machine 10.

The stator assembly 14 includes a cylindrical winding support structure 32 having a plurality of radially outwardly extending, axially aligned support fins 34 which define a plurality of winding slots 36 therebetween. The winding support structure 32, is adapted so as to be mounted over portions of the cylindrical bearing support areas 28 and 30 of end bells 20, 22. Thus, the housing assembly 12 and the winding support structure 32 combine to define a generally cylindrically shaped pressure cavity 38 wherein the stator assembly 14 is located. The stator assembly 14 further includes a plurality of stator windings 40, which are adapted to have sections thereof placed within the winding slots 36 of winding support structure 32. For a three-phase electrical machine, there will be three sets of stator windings 40 A, B, and C, more phases may be accommodated by the addition of added field windings. Stator assembly 14 also includes a cylindrical diamagnetic flux shield 42, formed for example from metal oxide based ceramic superconducting compounds such as $Y Ba_2 Cu_3 O_{7-x}$, which is mounted about the outer periphery of the support fins 34 of winding support structure 32, and separated from the stator windings 40 by a non-magnetic spacer 44.

The rotor assembly 16 is mounted internally to the stator assembly 14, and is depicted as including a cylindrical two pole permanent magnet 46 contained within a cylindrical retaining sleeve 48 and having a first end piece 50 and a second end piece 52 fixedly attached to the ends of the cylindrical retaining sleeve 48. Projecting from the first end piece 50 is a power coupling shaft 54, while a support shaft 56 projects from the second end piece 52. Power coupling shaft 54 projects through the cylindrical bearing support area 28 of first end bell 20 and is axially supported by bearing 58 mounted therewithin. Support shaft 56 similarly projects into the cylindrical bearing support area 30 of the second end bell 22 and is axially supported by bearing 60 mounted therewithin. Thrust bearings 62 and 64 may be required to be located between the end pieces 50, 52 of rotor assembly 16 and bearing support areas 28, 30 of end bells 20, 22. The rotor assembly may also include diamagnetic end flux shield disks 66 and 68 located adjacent to the ends of the permanent magnet 46 to focus the flux and to prevent magnet flux leakage at the ends of the magnet.

It should be noted that the support fins 38 are configured so as to extend along the winding support structure 36 only for the length of the permanent magnet 22 of rotor assembly 20, while the cylindrical portion of winding support structure 36 is approximately as long as the central housing section 18. At each end of the machine 10, there are defined toroidal cavities identified as inlet manifold 70 and outlet manifold 72. Within the manifolds 70 and 72 are located the end turn sections of stator windings 40. An aperture 74 within the central housing section 18 is used to bring winding leads 76 into the machine 10, which aperture 74 is sealed to prevent coolant leaks. The coolant inlet port 24 is configured to deliver cooling fluid into the inlet manifold 20 wherein the fluid is distributed around the circumference of the machine in intimate contact with the stator windings 40. The cooling fluid flows axially through the winding slots 36, cooling the stator windings 40 as well as the flux shield 42. Upon exiting the winding slots 36, the cooling fluid flows into outlet manifold 72 and is allowed to escape through coolant outlet port 26. This arrangement is ideal for providing coolant flow to the stator windings 40 and flux shield 42.

Figure 4A:
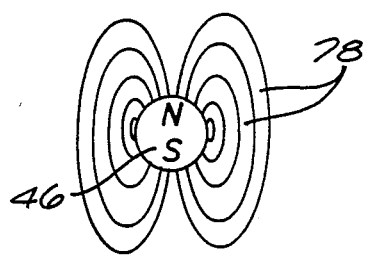
FIGS. 4A and 4B are schematic diagrams of the magnetic field surrounding the machines rotor assembly for a rotor in free space and a rotor surrounded by a diamagnetic flux shield.
Figure 4B:
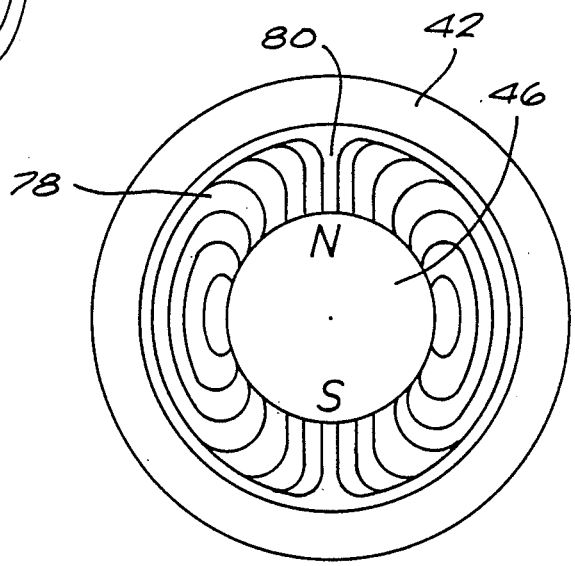

The effect that the flux shield 42 has upon the magnetic field surrounding the permanent magnet 46 can best be understood with reference to FIG. 4. FIG. 4 A and B shows schematic views of a cross-section of the cylindrical permanent magnet 46 which is diametrically magnetized, the magnetic field represented by magnetic lines of force 78 produced by the magnet, and the bottling effect that the flux shield 42 has on the magnetic field. FIG. 4A depicts the magnetic field which surrounds a cylindrical permanent magnet as it would exist in free space. The magnetic lines of force 78 prescribe generally eliptical paths of increasing size. FIG. 4B depicts the effect that the magnetic flux shield 42 has on the magnetic field surrounding the permanent magnet 46. The diamagnetic property of the flux shield 42 does not allow for penetration of the magnetic flux and thus the flux shield compresses the magnetic field surrounding the magnet 46 into the cylindrical space 76 between the inner diameter of flux shield 42 and the outer diameter of permanent magnet 46. As the permanent magnet 46 is caused to rotate with the rotor assembly 16 of FIG. 1, the magnetic field will also rotate within the cylindrical space 80 resulting in a time varying magnetic field at any given point therein. Thus, when the stator windings 40 are placed within the cylindrical space 80, they will be subjected to the time varying magnetic field.

When the dynamoelectric machine 10 is operating as a generator, mechanical shaft power is provided via power coupling shaft 54 to cause the rotor assembly 16 to rotate. The two pole permanent magnet 46 and its surrounding magnetic field thus also rotate producing a potential in stator windings 40 which may be connected to a power consuming device (not shown) external to the machine 10. Conversely, when the machine 10 is operating as a motor, current is supplied sequentially to stator windings 40 which themselves then produce a magnetic field to react with the magnetic field of rotor assembly 16 to drive the rotor assembly 16 and yield a mechanical output via power coupling shaft 54.

For the machine of the present invention wherein the rotor assembly 16 includes the cylindrical two pole permanent magnet 46, it may be appreciated that due to magnetic field distortion caused by the flux shield 42 there will be an increased possibility of end leakage of magnetic flux at the ends of the cylindrical permanent magnet 46. To prevent end leakage, the rotor assembly 16 may include the pair of flux shield disks 66, 68 located proximate to the ends of the permanent magnet 46 and inside of end pieces 50 and 52. These flux shield disks 66, 68 are formed of a superconductive, diamagnetic material such as those compounds identified generally by the formula $Y Ba_2 Cu_3 O_{7-x}$.

Figure 5:
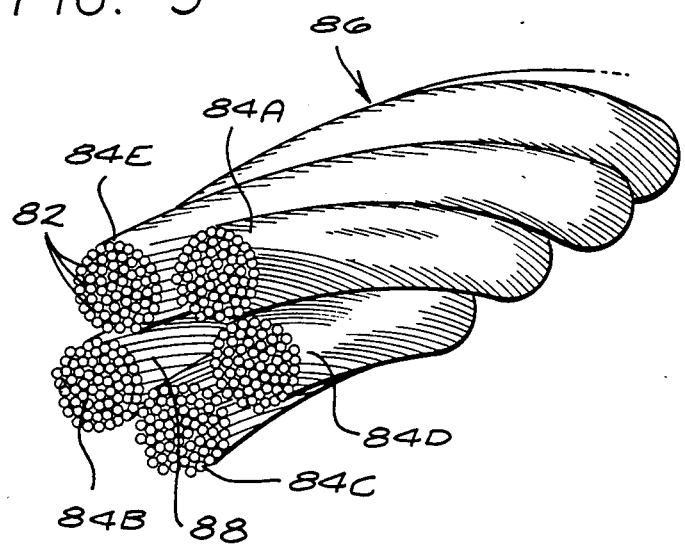
FIG. 5 is a partially cross-sectional partially perspective view of a Litz cable.
Figure 1:
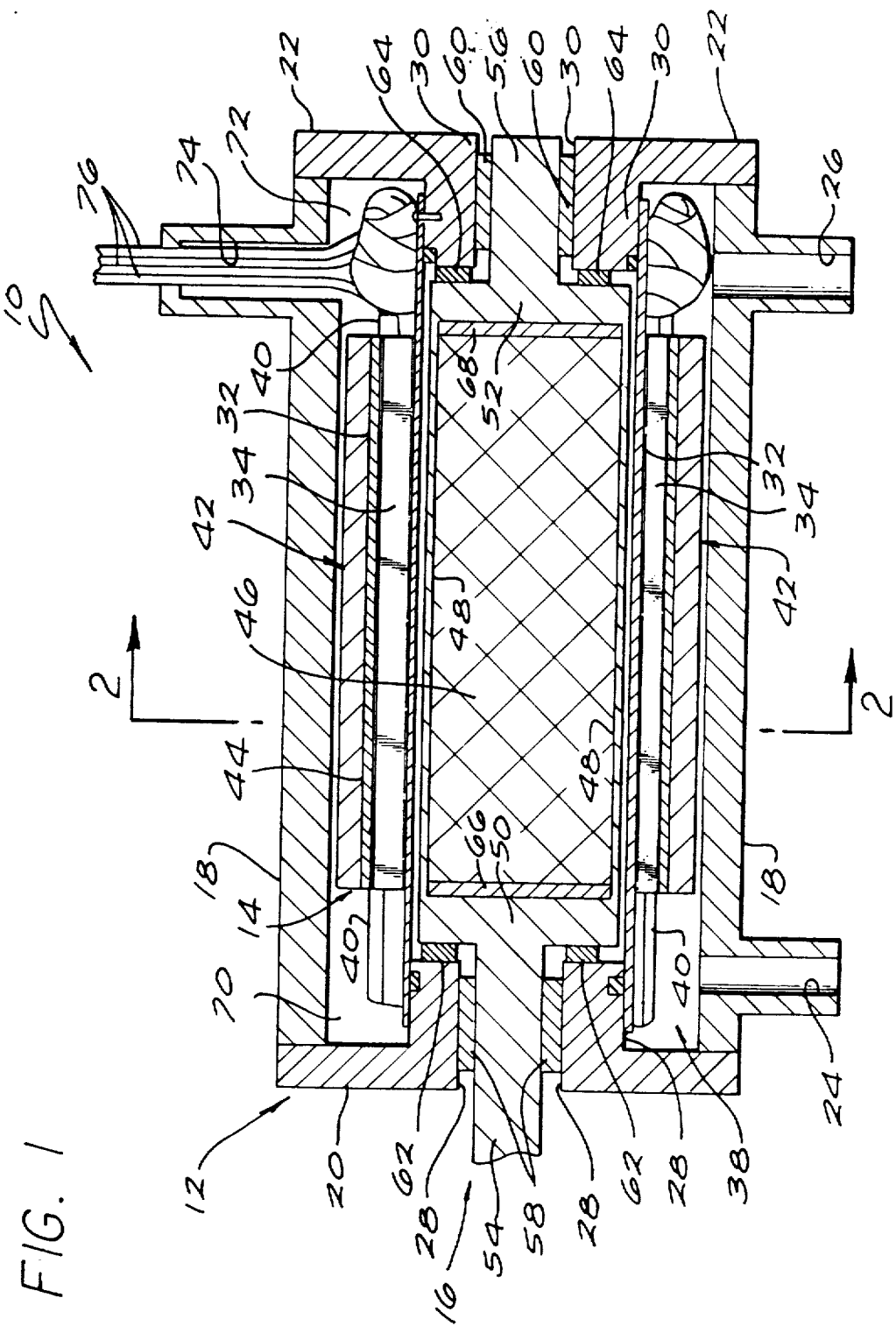

The stator windings 40 of the machine 10 will be required to carry relatively high current densities within a high magnetic flux environment. Thus, it is desirable to use multiple thin strands of either copper or aluminum wire, bundled in a fully transposed "Litz" configuration. The Litz configuration as shown in FIG. 5 includes a number of individual thin strands of wire 82 equally divided into five cables 84, which five cables are then wound together so as to create a bundled cable 86 having an opening 88 within the center for coolant fluid flow. It is important to note that within the Litz configuration each individual strand traverses all possible distances from the rotor assembly somewhere along its length within the winding slot. This prevents recirculating currents when all of the individual strands are connected at the output.

As an alternative to the copper or aluminum wires for the stator windings 40, wires made from metal oxide and ceramic superconducting compounds such as $Y Ba_2 Cu_3 O_{7-x}$ may also be used within the dynamoelectric machine 10. In the event that superconducting wires are used, it may be appreciated that the diamagnetic property of the material will not allow magnetic flux penetration. Thus, the magnetic flux will be forced to go around the field windings 40 and will effectively progress radially outward along the support fins 34. Upon reaching the proximity of the flux shield 42, the magnetic flux will turn and be concentrated close to the interior wall of flux shield 42 until reaching the opposite magnetic pole of the permanent magnet at which time the flux will turn and progress radially inwardly along another support fin 34, thus completing the magnetic path and providing the necessary linking of stator windings 40.

While the invention has been described as having a rotor made up of a solid two pole permanent magnet, it may be appreciated that the invention is capable of operating with any type of rotor which provides a high magnetic field strength, such as for example a DC exited rotor utilizing superconducting field windings. This and other modifications of the invention will become apparent to those skilled in the art. Accordingly, it is to be understood that within the scope of the appended claims the invention may be practiced otherwise than is specifically described.

What is claimed is:

1. A stator for a dynamoelectric machine comprising:
   a plurality of stator windings;
   winding support means of non-magnetic material for supporting and separating said plurality of stator windings;
   a cylindrical flux shield of diamagnetic material mounted around the outer periphery of said winding support means and said stator windings to contain a magnetic field internally to said flux shield.

2. The stator of claim 1 wherein said diamagnetic material of said flux shield is a metal oxide based ceramic compound.

3. The stator of claim 1 wherein said stator windings comprise a plurality of fully transposed fine strands of wire.

4. The stator of claim 3 wherein said fine strands of wire are insulated copper wires.

5. The stator of claim 3 wherein said fine strands of wire are insulated aluminum wires.

6. The stator of claim 1 wherein said stator windings are insulated superconducting wires.

7. The stator of claim 1 wherein said winding support means comprises a generally cylindrical support structure having a plurality of radially outwardly projecting fins aligned with the axis of said cylinder to define therebetween a plurality of winding slots.

8. A dynamoelectric machine comprising:
   a rotor means for producing a high strength magnetic field;
   at least one stator winding disposed about said rotor means;
   means for supporting said stator winding, said means for supporting formed of non-magnetic material;
   a substantially cylindrical flux shield means of superconducting diamagnetic materials, mounted around said stator winding and said means for supporting, for containing the magnetic field produced by said rotor means internally to said flux shield means;
   a housing for containing said rotor means, said stator winding, said means for supporting, and said flux shield means;
   a winding lead conductor attached to said stator winding and adapted to be connected to an electrical device external to said housing; and
   a power coupling shaft connected to said rotor means and adapted to be coupled with a mechanical device external to said housing.

9. The machine of claim 8 wherein said superconducting diamagnetic materials are metal oxide based ceramic compounds.

10. The machine of claim 8 wherein said metal oxide based ceramic compounds have the chemical formula $Y Ba_2 Cu_3 O_{7-x}$.

11. The machine of claim 8 wherein said rotor means comprises:
    a solid cylinder of high magnetic strength magnetic material which is diametrically magnetized;
    a pair of flux shield disks of diamagnetic material located adjacent the ends of said solid cylinder to prevent end flux leakage;
    a cylindrical retaining sleeve of non-magnetic material mounted about said cylinder of high strength magnetic material and said flux shield disks; and
    a pair of end pieces attached to said cylindrical retaining sleeve.

12. The machine of claim 11 wherein said diamagnetic material of said flux shield disks is a metal oxide based ceramic compound.

13. The machine of claim 8 further comprising:
    spacer means of non-magnetic non-conducting material for shielding said stator winding from said flux shield.

14. The machine of claim 8 wherein said housing further includes a coolant fluid inlet port, and a coolant fluid outlet port to allow coolant fluid to be passed through said dynamoelectric machine in intimate contact with said stator winding and said flux shield means.

* * * * *

UNITED STATES PATENT AND TRADEMARK OFFICE
CERTIFICATE OF CORRECTION

PATENT NO. : 4,908,347
DATED : Mar. 13, 1990
INVENTOR(S) : Joseph Denk

It is certified that error appears in the above-identified patent and that said Letters Patent is hereby corrected as shown below:

Sheet 1 of 2, consisting of Fig. 1, should be deleted to be replaced with sheet 1 of 3, consisting of Fig. 1, as shown on the attached sheet.

Signed and Sealed this

Twenty-sixth Day of March, 1991

*Attest:*

HARRY F. MANBECK, JR.

*Attesting Officer*  *Commissioner of Patents and Trademarks*